United States Patent
Fabrega Sanchez et al.

(10) Patent No.: US 12,340,264 B1
(45) Date of Patent: Jun. 24, 2025

(54) BATTERY ANTENNA FOR SMART LABEL

(71) Applicant: QUALCOMM Incorporated, San Diego, CA (US)

(72) Inventors: Jorge Fabrega Sanchez, San Diego, CA (US); Phillip Minh-Quang Vo Tran, San Diego, CA (US); Ian Neumann, La Mesa, CA (US); Peter Lien, Carlsbad, CA (US); Neil Burns, San Diego, CA (US); Stein Lundby, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/610,475

(22) Filed: Mar. 20, 2024

(51) Int. Cl.
G06K 19/07 (2006.01)
G06K 19/077 (2006.01)

(52) U.S. Cl.
CPC ..... G06K 19/0702 (2013.01); G06K 19/0726 (2013.01); G06K 19/07758 (2013.01)

(58) Field of Classification Search
CPC .......... G06K 19/0702; G06K 19/0726; G06K 19/07758
USPC ........................................................ 235/492
See application file for complete search history.

(56) References Cited

U.S. PATENT DOCUMENTS

| | | | |
|---|---|---|---|
| 11,126,901 B2 | 9/2021 | Badri et al. | |
| 11,165,107 B2 | 11/2021 | Ryoo et al. | |
| 2004/0217865 A1 | 11/2004 | Turner | |
| 2012/0305654 A1* | 12/2012 | Wang | G06K 19/07707 235/492 |
| 2017/0288736 A1* | 10/2017 | Zhou | H01Q 1/248 |
| 2020/0029902 A1 | 1/2020 | Kube et al. | |
| 2022/0131271 A1* | 4/2022 | Hänninen et al. | H01Q 7/00 |
| 2023/0048762 A1* | 2/2023 | Aksamija | E04B 1/7654 |
| 2023/0122858 A1* | 4/2023 | Pun | H01M 4/622 29/832 |
| 2023/0147710 A1* | 5/2023 | Saker | G16H 20/60 705/2 |
| 2024/0029589 A1* | 1/2024 | Krejcarek | G06K 1/121 |
| 2024/0266843 A1* | 8/2024 | Wobak | H02J 50/20 |
| 2024/0387984 A1* | 11/2024 | Marin | G04G 17/045 |

FOREIGN PATENT DOCUMENTS

CN 106469326 A 3/2017

\* cited by examiner

*Primary Examiner* — Allyson N Trail
(74) *Attorney, Agent, or Firm* — SUNSTEIN LLP/Qualcomm Incorporated

(57) ABSTRACT

Techniques are provided for reducing the form factor of smart labels. An example smart label includes a flexible circuit board comprising two or more layers, a communications circuit including at least one transceiver disposed on one of the two or more layers, an antenna tuning circuit disposed on one of the two or more layers and configured to receive radio frequency signals from the communications circuit, at least one flexible battery disposed on a first layer of the two or more layers and configured to provide power to the communications circuit, and an antenna element disposed on a second layer of the two or more layers and proximate to the at least one flexible battery, wherein the antenna element is configured to receive the radio frequency signals from the antenna tuning circuit.

20 Claims, 13 Drawing Sheets

BATTERY ANTENNA FOR SMART LABEL

FIELD

The present disclosure relates generally to wireless communication, and more specifically to a smart label.

BACKGROUND

A wireless device (e.g., a cellular phone, an Internet of Things (IoT) device, a smart label, etc.) may include a transmitter and/or a receiver coupled to an antenna to support one-way or two-way communications. In general, the transmitter may modulate a radio frequency (RF) carrier signal with data to obtain a modulated signal, amplify the modulated signal to obtain an output RF signal having the proper power level, and transmit the output RF signal via the antenna to a base station. For data reception, the receiver may obtain a received RF signal via the antenna and may condition and process the received RF signal to recover data sent by the base station. As the radio frequency used by the wireless device increases, the complexity of the RF transmitting circuitry also increases. To facilitate and/or enable wireless signal applications, numerous types of antennas have been developed, with different antennas used based on the needs of an application, e.g., distance, frequency, operational frequency bandwidth, antenna pattern beam width, gain, beam steering, etc. Different antenna configurations may be implemented in newer form factors for devices utilizing such RF technologies.

SUMMARY

An example smart label according to the disclosure includes a flexible circuit board, a communications circuit including at least one transceiver disposed on the flexible circuit board, an antenna tuning circuit disposed on the flexible circuit board and configured to receive radio frequency signals from the communications circuit, and at least one flexible battery disposed on the flexible circuit board and configured to provide power to the communications circuit and receive the radio frequency signals from the antenna tuning circuit.

An example smart label according to the disclosure includes a flexible circuit board comprising two or more layers, a communications circuit including at least one transceiver disposed on one of the two or more layers, an antenna tuning circuit disposed on one of the two or more layers and configured to receive radio frequency signals from the communications circuit, at least one flexible battery disposed on a first layer of the two or more layers and configured to provide power to the communications circuit, and an antenna element disposed on a second layer of the two or more layers and proximate to the at least one flexible battery, wherein the antenna element is configured to receive the radio frequency signals from the antenna tuning circuit.

An example method of transmitting a radio frequency signal with a flexible battery according to the disclosure includes providing a direct current voltage from one or more flexible batteries to a communications circuit, generating the radio frequency signal with the communications circuit, and providing the radio frequency signal to a terminal on one of the one or more flexible batteries.

An example method for transmitting a radio frequency signal with a smart label according to the disclosure includes receiving, with a communications circuit, a direct current voltage from one or more flexible batteries disposed on a first layer of a flexible circuit board, generating the radio frequency signal with the communications circuit, and providing the radio frequency signal to an antenna disposed on a second layer of the flexible circuit board and proximate to at least one flexible battery in the one or more flexible batteries, wherein the antenna electromagnetically couples with the at least one flexible battery.

Items and/or techniques described herein may provide one or more of the following capabilities, as well as other capabilities not mentioned. A smart label may be disposed on a package to enable tracking applications. The smart label may be configured to communicate with wireless networks. The dimensions of the smart labels may be reduced to lower costs and improve operational utilization. The smart label may include one or more layers of flexible circuit board. Flexible batteries may be used as antenna radiators and decoupling components may be used on the battery power feed lines. In an example, planar antennas may be disposed proximate to the flexible batteries such that an antenna and a flexible battery may electromagnetically couple at the operational radio frequency of the smart label. In an example, a smart label may include power management and rectifier components configured to harvest ambient radio frequency signals to charge the flexible batteries. The form factor of a smart label may be reduced, and the operational life may be extended. Other capabilities may be provided, and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Techniques are discussed for reducing the form factor of smart labels. In an example use case, smart labels may be configured to assist with tracking packages using Wireless Wide Area Network (WWAN) and Wireless Local Area Network (WLAN) networks. Such labels may be implemented in a Flexible Printed Circuit Board (PCB) and include very thin printed battery cells, an IOT module, sensors and an antenna. The antenna may be printed in the same flexible PCB (FPC) but in a different area from the battery. An example smart label may include at least one battery printed on a FPC. One or more of the at least one battery may be used as an antenna, or the antenna may be formed in a layer of the flexible PCB that overlaps the at least one battery. The battery shape and size may be selected for a desired frequency and performance characteristic. The radio frequency (RF) may be decoupled from other circuitry of the label by decoupling circuits (e.g., cap, or inductor or ferrite bead). The antenna may also be configured for energy harvesting. Other configurations, however, may be used.

Particular aspects of the subject matter described in this disclosure may be implemented to realize one or more of the following potential advantages. The form factor of a smart label and the manufacturing costs may be reduced. The flexible features of the FPC and the printed batteries may increase the durability and operational robustness of a smart label. Power consumption may be reduced. Energy harvesting may enable extended operation of a smart label. Recharging labels may be reused to meet sustainability objectives. Other advantages may also be realized.

Figure 1:
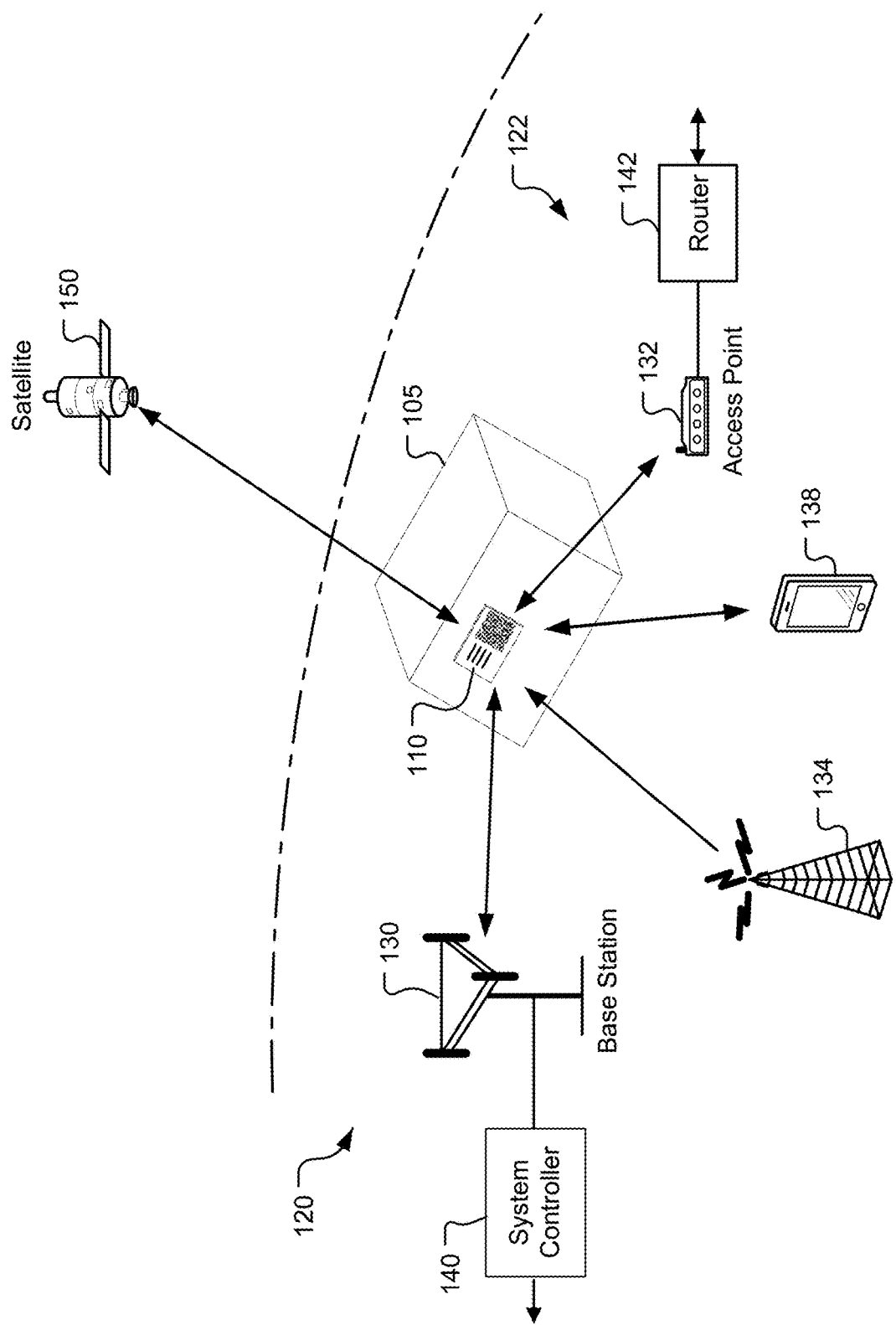
FIG. 1 shows a smart label capable of communicating with different wireless communication systems.

Referring to FIG. 1, a smart label 110 capable of communicating with different wireless communication systems 120 and 122 is shown. In an use case, the smart label 110 may be affixed to a package 105 and configured to communicate with the wireless communication systems 120, 122 to provide tracking information, or other state based information. For example, the package 105 may include additional sensors (e.g., temperature, pressure, accelerometers, etc.) configured to communicate with the smart label 110, and the smart label 110 may be configured to send measurement values associated with the additional sensors, and/or control the additional sensors based on signals sent and/or received via the wireless communication systems 120, 122. The wireless communication system 120 may be a wireless wide area network (WWAN), such as a Code Division Multiple Access (CDMA) system (which may implement Wideband CDMA (WCDMA), cdma2000, or some other version of CDMA), a Global System for Mobile Communications (GSM) system, a Long Term Evolution (LTE) system, a 5G system, etc. The wireless communication system 122 may be a wireless local area network (WLAN) system, which may implement IEEE 802.11, etc. For simplicity, FIG. 1 shows the wireless communication system 120 including a base station 130 and a system controller 140, and the wireless communication system 122 including an access point 132 and a router 142. In general, each system may include any number of stations and any set of network entities.

The smart label 110 is a wireless device and may also be referred to as an IoT device, a mobile device, a mobile station, a terminal, an access terminal, a subscriber unit, a station, a wireless local loop (WLL) station, a medical device, a device in an automobile, a Bluetooth device, a thin tracker, etc. The smart label 110 may be equipped with various combinations of batteries and antennas as described herein. In an example, multiple antennas may be utilized to improve performance, to simultaneously support multiple services, to provide diversity against deleterious path effects (e.g., fading, multipath, and interference), to support multiple-input multiple-output (MIMO) transmission to increase data rate, and/or to obtain other benefits. The smart label 110 may be capable of communicating with one or more wireless communication systems 120 and/or 122. The smart label 110 may also be capable of receiving signals from broadcast stations (e.g., a broadcast station 134, a user equipment (UE) 138). In an example, the smart label 110 may be configured to communicate with proximate devices, such as the UE 138, via sidelink protocols (e.g., NR-SL). For example, the smart label 110 may be configured to communicate directly with other wireless devices, e.g., without relaying communications through a base station or access point or other network device. The smart label 110 may also be capable of communicating with satellites (e.g., a satellite 150), for example in receiving signals in one or more global navigation satellite systems (GNSS) and/or transmitting signals to satellites in other systems.

In general, the smart label 110 may support communication with a number of wireless systems, which may employ radio technologies such as WCDMA, cdma2000, LTE, 5G, GSM, 802.11, Bluetooth®, ultrawide band (UWB), GPS, etc. The smart label 110 may also support operation on other frequency bands. In an example, the smart label 110 may be configured to utilize LTE FDD with RF Bands B1/B3/B5/B7/B8/B20/B28 and 2.4 GHz WiFi bands. Other bands and protocols may also be used. In an example, the smart label 110 may support operation at a very high frequency, e.g., within millimeter-wave (MMW) frequencies from 24 to 300 gigahertz (GHz) or higher. Other very high frequency (e.g., 5G) bands, such as 60 GHz or higher frequency bands, may also be realized with the smart label 110 and implemented as one of the bands. The smart label 110 may include an antenna system to support CA operations at MMW frequencies. The antenna system may include a number of antenna elements, with each antenna element being used to transmit and/or receive signals. The terms "antenna" and "antenna element" are synonymous and are used interchangeably herein. Generally, each set of antenna elements may be implemented with a patch antenna or a strip-shaped radiator, or a flexible battery as described herein. A suitable antenna type may be selected for use based on the operating frequency of the wireless device, the desired performance, etc. In an exemplary design, an antenna system may include a number of patch and/or strip-type antennas supporting operation at MMW frequencies.

Figure 2:
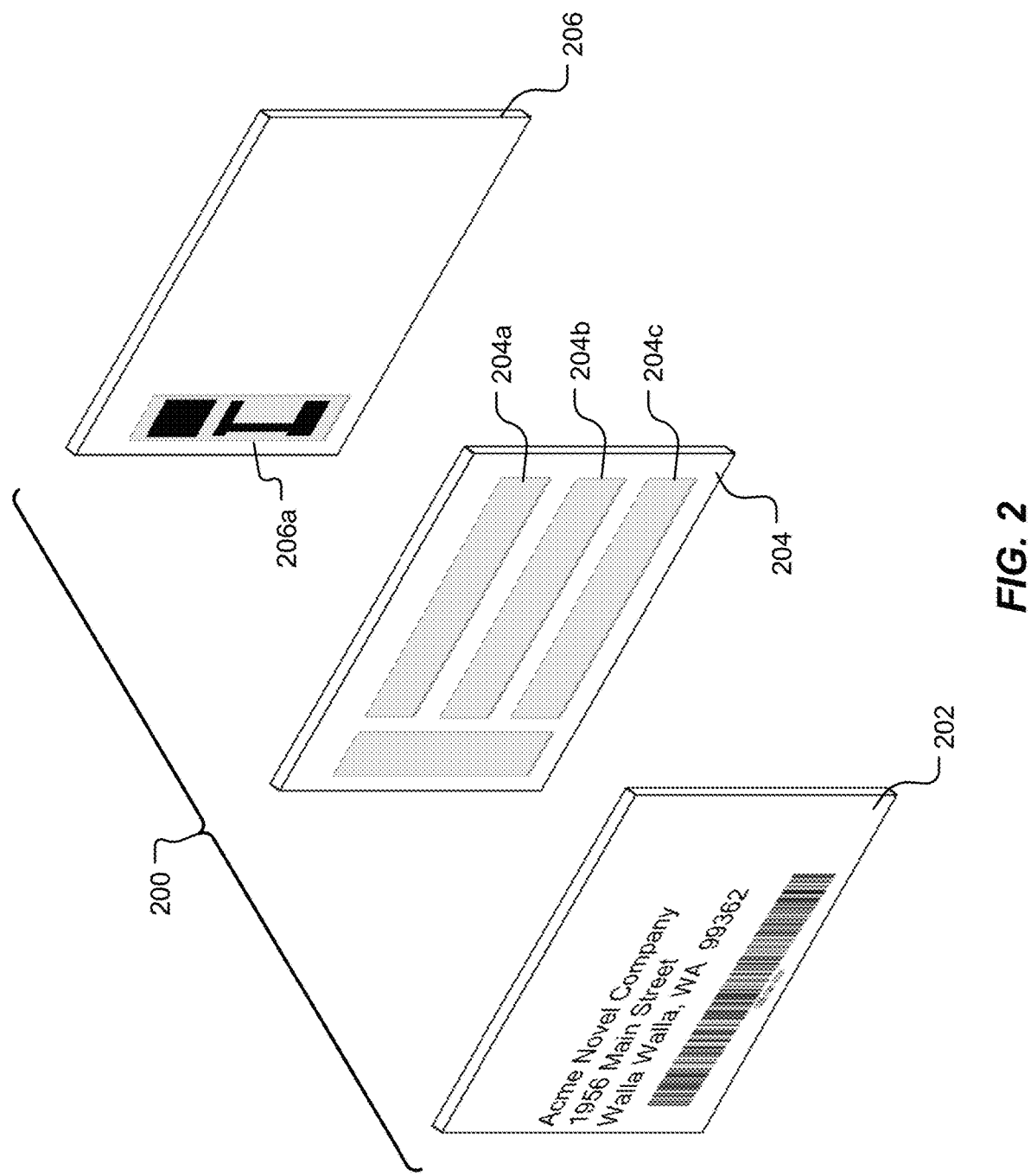
FIG. 2 is an exploded view of an example smart label.

Referring to FIG. 2, an exploded view of an example smart label 200 is shown. The smart label 110 may have some or all of the components of the smart label 200. In general, the smart label 200 is a thin (e.g., approximately 2 mm) and printable smart label configured to provide near real-time visibility of package locations. In an example, a printable surface 202 may include human and/or machine readable information such as text, bar codes, QR codes, etc., and an adhesive backing configured to affix the smart label 200 on a package or other object to be tracked (e.g., inventory bins, rolling tool boxes, test equipment, bulkhead spares, or other movable assets). In an example, the smart label 200 may be approximately 200 mm×150 mm×2.0 mm. Other sizes may also be used. The smart label 200 may include a flexible PCB (FPC) comprising one or more layers with power and processing components. FPCs are PCBs which may be bent or twisted without damaging the circuits. Example materials of the FPCs include Polyamide, Polyetheretherketone (PEEK), and conductive polyester films. In an example, a battery layer 204 may include one or more thin printable batteries 204a, 204b, 204c configured to provide power to a circuit layer 206 including signaling components 206a, such as processors, modems and transceivers. In an example, the batteries 204a, 204b, 204c may utilize non-lithium based battery chemistry configured to produce 100 mAh of power. The circuit layer 206 may be a system in package (SiP) including components to support WWAN and WLAN communications and RF based positioning. In an example, the circuit layer may include a pre-provisioned eSIM for narrow band IoT (NBIOT) connectivity (e.g., 700 MHz to 2.2 GHz), and the circuit layer 206 may be configured for cellular NBIOT scanning based positioning support. The SiP may include a GNSS receiver and may be configured to determine a position based on receiving satellite signals.

The configuration of the smart label 200 and the FPC layers are examples, and not limitations. In an example, one or more of the batteries 204a, 204b, 204c may be disposed on the circuit layer 206 with the signaling components 206a. The batteries 204a, 204b, 204c, may be based on other flexible battery technologies (e.g., RIOT Energy, Imprint Energy's ZinCore™, etc.). In an example, each of the batteries 204a, 204b, 204c may be rated at 1.5V and 150 mAH. Other battery configurations and cells may be used. In an example, the dimensions of the flexible battery may be determined based on the operational frequency of the smart label.

Figure 3:
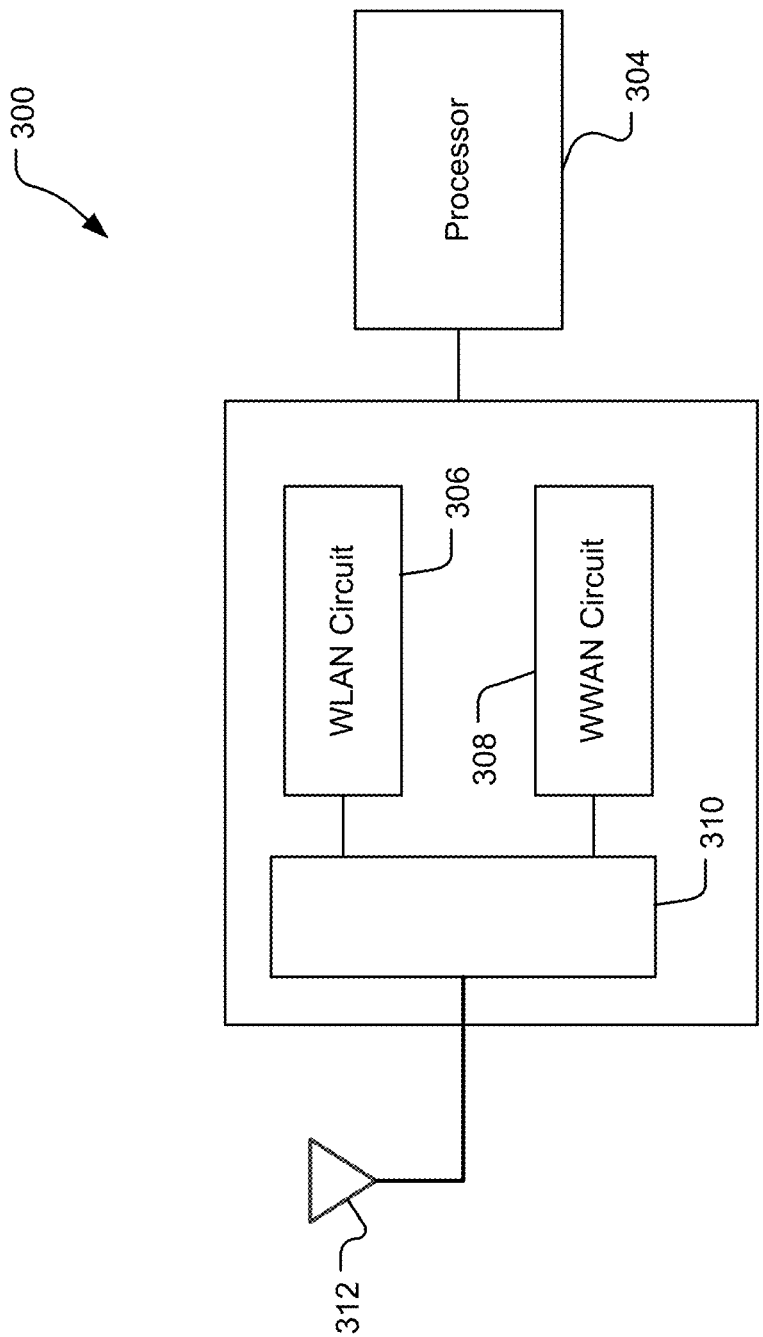
FIG. 3 is a block diagram of an example communication circuit in a smart label.

Referring to FIG. 3, a block diagram of an example communications circuit 300 with multiple transceivers is shown. The communications circuit 300 may be included in a SiP in the circuit layer 206, and is an example of transceivers and modems in the smart label 200. The communications circuit 300 may include and/or be communicatively coupled to a processor 304 in the SiP. One or more RF circuits such as a WLAN circuit 306 and a WWAN circuit 308 may be communicatively coupled to one or more antennas 312 via one or more multiplexers 310. The multiplexers 310 may include switches and tuning circuits (e.g., impedance matching) configured to enable the WLAN circuit 306 or the WWAN circuit 308 to send and/or receive signals via the one or more antennas 312. In an example, the WLAN circuit 306 and the processor 304 may be configured for Bluetooth® channel sounding (BTCS) which may utilize a combination of round trip time (RTT) and round trip phase (RTP) measurement techniques. Other WLAN and sidelink technologies, such as WiFi, UWB, NR Sidelink (SL) may be used. The WWAN circuit 308 and the processor 304 may be configured for cellular NBIOT communications and positioning. In an example, the WWAN circuit 308 may be configure for other WWAN technologies, such as WCDMA, cdma2000, LTE, 5G, and GSM.

Figure 4A:
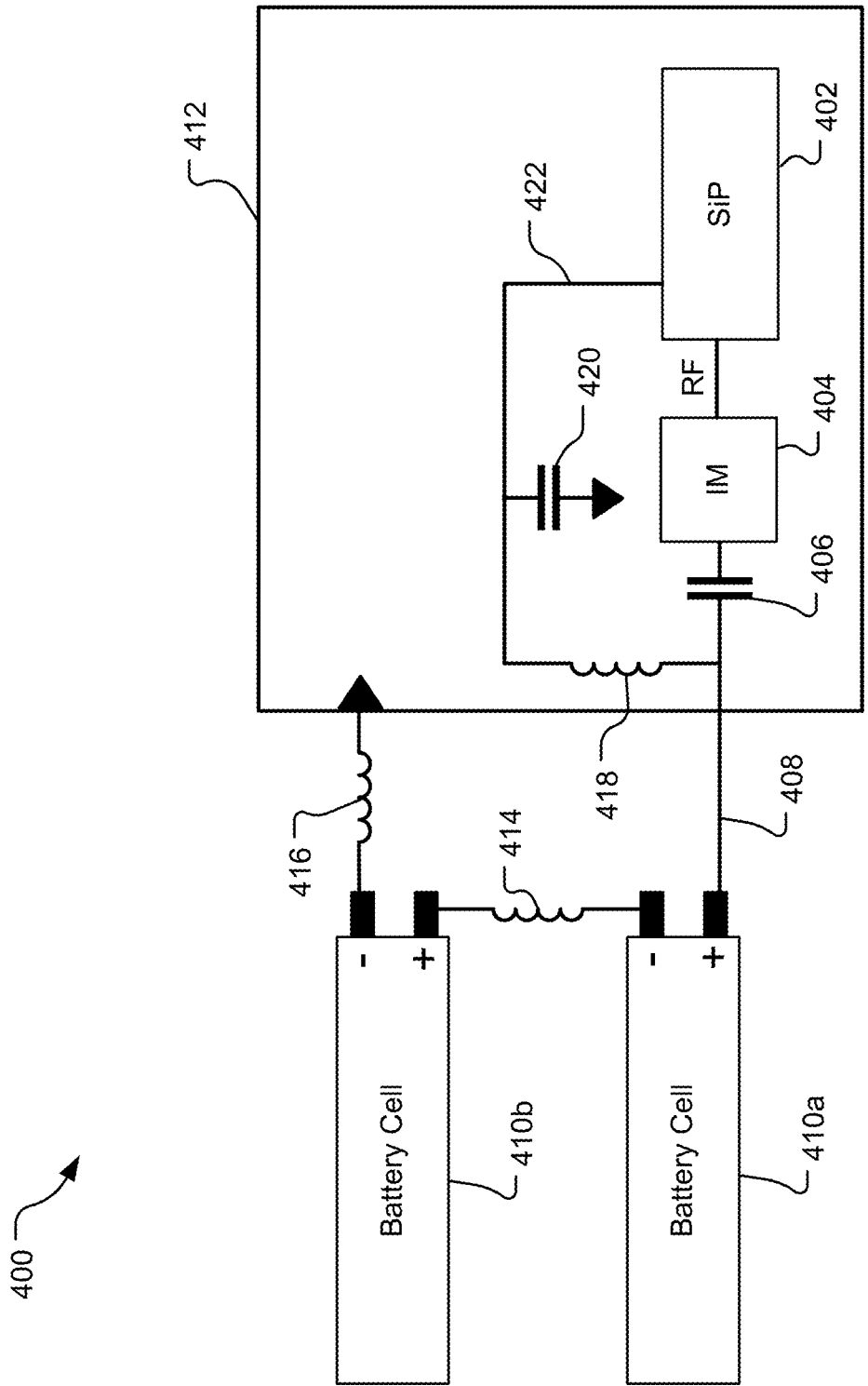
FIGS. 4A and 4B are block diagrams of example smart labels utilizing battery electrodes as antenna radiators.
Figure 4B:
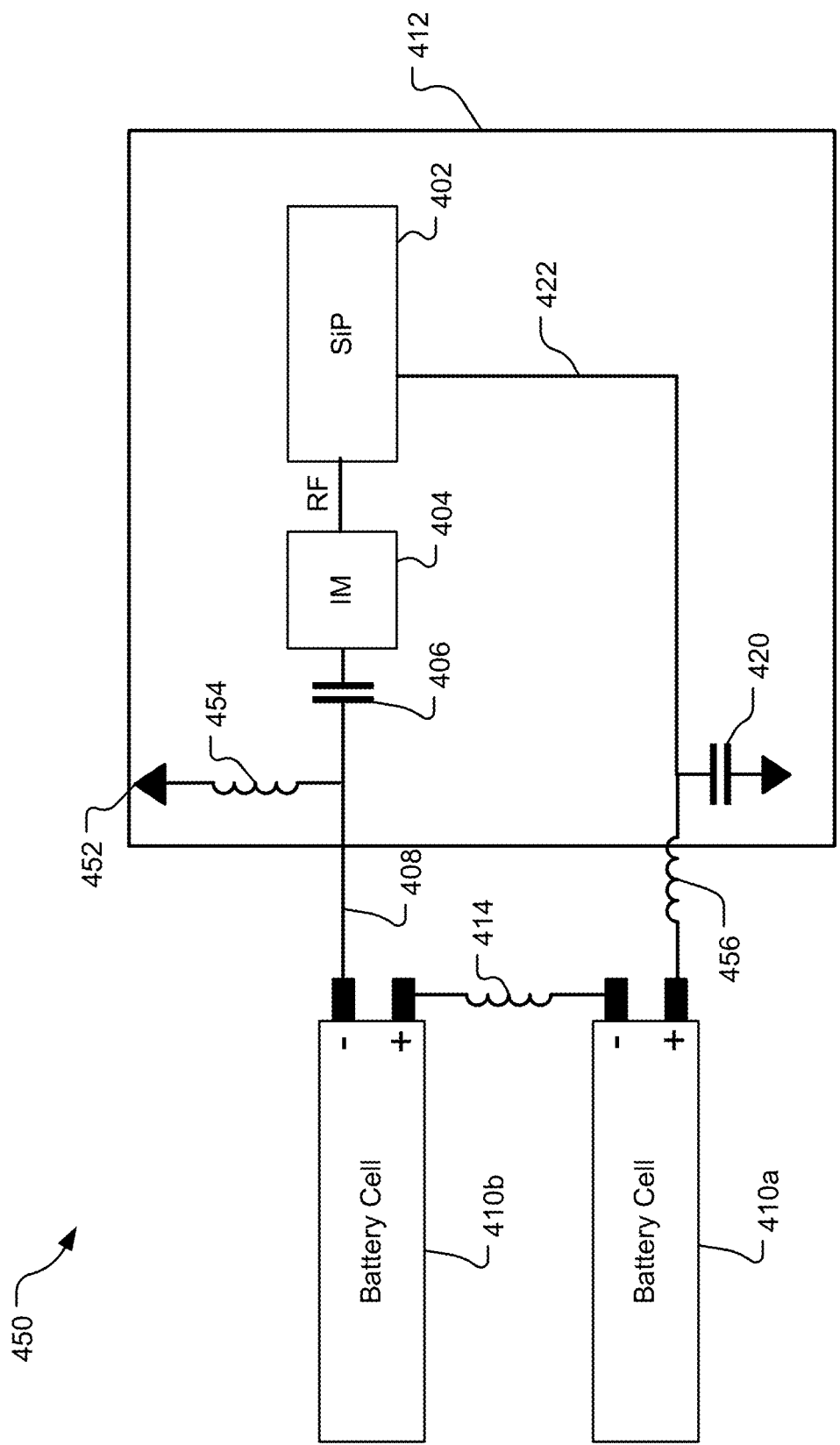

Referring to FIGS. 4A and 4B, with further reference to FIG. 2, block diagrams of example smart labels utilizing battery electrodes as antenna radiators are shown. The depictions of the example smart labels in FIGS. 4A and 4B include a battery and circuit layer (in separate layers, or in a combined layer). Other features, such as the printable surface and adhesive backing, are not shown. A first example smart label 400 includes components on one or more FPC layers, such as the battery layer 204 and the circuit layer 206. The smart label 400 includes a SiP 402, an antenna tuning circuit 404 (e.g., antenna matching circuits, impedance matching (IM) circuits), a first battery cell 410a, a second battery cell 410b, and a ground area 412. The number and configurations of the battery cells are examples and not limitations. In an example, some or all of the battery cells may be disposed on a FPC layer that does not include the SiP 402. The batteries may be coupled in series (e.g., as depicted in FIG. 4A) or in parallel to provide power to the SiP 402. The dimensions of the battery cells 410a, 410b may be varied based on the operational frequency of the smart label 400. The SiP 402 is configured to receive power from the battery cells 410a, 410b and to provide RF signals to a positive battery electrode on the first battery cell 410a via the antenna tuning circuit 404. The SiP 402 may include some or all of the components of the communications circuit 300. In the example smart label 400, an RF feedline 408 is coupled to a positive terminal of a first battery cell 410a and the antenna tuning circuit 404. A DC blocking circuit 406 may include one or more components, such as a capacitor, configured to reduce the DC voltage in the antenna tuning circuit 404. The SiP 402 may receive DC power from the RF feedline 408 via filtering components. For example, a bias tee configuration includes an inductor 418 and a capacitor 420 may be used to reduce the RF component on a power feedline 422 to the SiP 402. The capacitor 420 may be coupled to ground. Additional RF decoupling components may be disposed between the battery cells and ground. For example, a first RF decoupler 414 may be placed in series with the battery cells 410a, 410b, and a second RF decoupler 416 may be disposed between the battery cells and ground. The decouplers 414, 416, 418 may include inductors and/or ferrite beads configured to provide resistance to the RF signals. In an example, an aperture tuner may be coupled to an electrode of one or more of the battery cells 410, 410b. The smart label 400 is configured to utilize the battery as both a power source and a RF antenna. The combination may be implemented to reduce the form factor and costs of the smart label.

Referring to FIG. 4B, a second example smart label 450 may be configured to couple the RF feedline 408 to a negative terminal on a battery cell. For example, the SiP 402 may be coupled to the antenna tuning circuit 404, and the antenna tuning circuit 404 may be coupled to the negative terminal of the second battery cell 410b via a DC blocking circuit 406 and the RF feedline 408. A first RF decoupler 454 may be disposed between the RF feedline 408 and a ground point 452, and a second RF decoupler 456 may be disposed on the power feedline 422. The decouplers 414, 454, 456 may include inductors, ferrite beads, or other components configured to trap the RF signal injected into the battery cell.

Referring to FIGS. 5A-5D, block diagrams of example smart labels with antenna elements disposed proximate to flexible battery cells are shown. The example smart labels in FIGS. 5A-5D include antenna elements disposed proximate to one or more battery cells such that the antenna elements are electromagnetically coupled to one or more battery cells. The proximity of the one or more battery cells and the antenna elements enables a smaller form factor for a smart label, and the flexibility of the FPC and the batteries may enable a more robust smart label which may tolerate some degree of bending while affixed to a flexible surface (e.g., the side of a cardboard box). The antenna elements may be planar configurations (e.g., patch antennas, strip lines, etc.) and may be on different layers of the FPC than the flexible battery cells. RF decoupling circuits may be used to isolate the DC lines as described in FIGS. 4A and 4B. Different antenna configurations, such as monopole antennas, inverted F antennas (IFA), slot and loop antennas, may be disposed proximate to one or more battery cells in configurations which may cause an electromagnetic coupling with one or more battery cells. In an example, the dimensions of the battery cells may be selected to increase the electromagnetic coupling. The antenna and battery configurations in FIGS. 5A-5D are examples, and not limitations, as other battery cell configurations and antenna designs may be used. The depictions of the example smart labels in FIGS. 5A-5D include battery and circuit layers. Other smart label features, such as the printable surface and adhesive backing, are not shown.

Figure 5A:
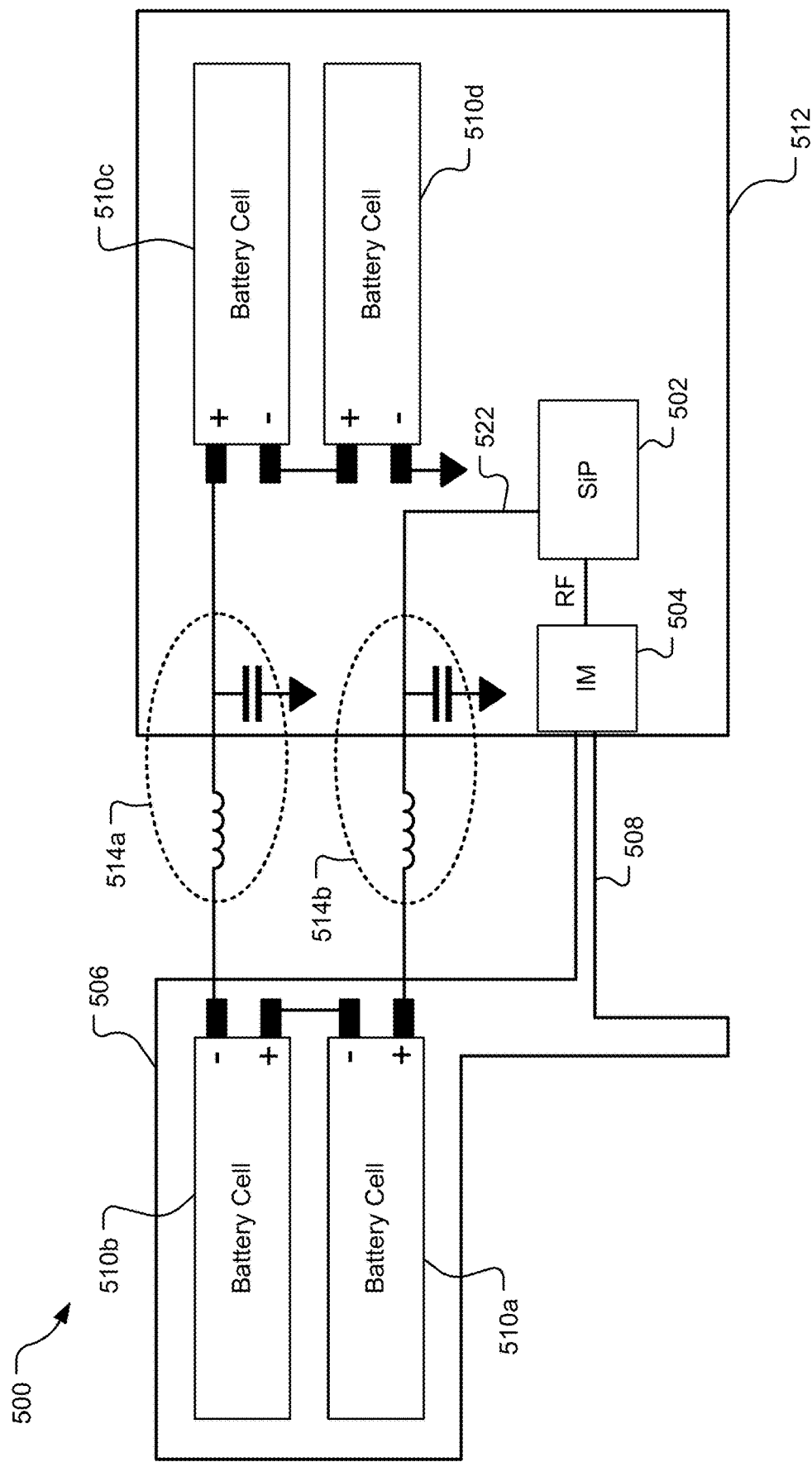
FIGS. 5A-5D are block diagrams of example smart labels with antenna elements disposed proximate to flexible battery cells.

Referring to FIG. 5A, a third example smart label 500 includes a SiP 502, an antenna tuning circuit 504, a monopole antenna 506, a plurality of battery cells 510a, 510b, 510c, 510d, a plurality of RF decoupling circuits 514a, 514b, and a ground area 512. The SiP 502 may include some or all of the components of the communications circuit 300 and is configured to couple to the monopole antenna 506 via the antenna tuning circuit 504 and a feedline 508. The antenna tuning circuit 504 may include fixed and or variable components, such as variable capacitors, configured to generate impedance based on the RF signal (e.g., impedance matching). In an example, the SiP 502 may be configured to control one or more variable components in the antenna tuning circuit 504 to adjust the impedance of the RF feed. The monopole antenna 506 may be a conductor (e.g., copper, aluminum, etc.) disposed on a first layer of the FPC and proximate to a first battery cell 510a and a second battery cell 510b which are disposed on a second layer of the FPC. The feedline 508 may be a strip conductor coupled to the antenna tuning circuit 504. The first RF decoupling circuit 514a and the second RF decoupling circuit 514b may be disposed on a DC power feed 522 to filter out the RF signals. Additional RF decoupling circuits may be used based on the battery configuration. In an example, the RF decoupling circuits 514a, 514b may include inductors and capacitors (e.g. bias tee) based on the frequency of the RF signals. Other components, such as ferrite beads, may be used in the RF decoupling circuits.

Figure 5B:
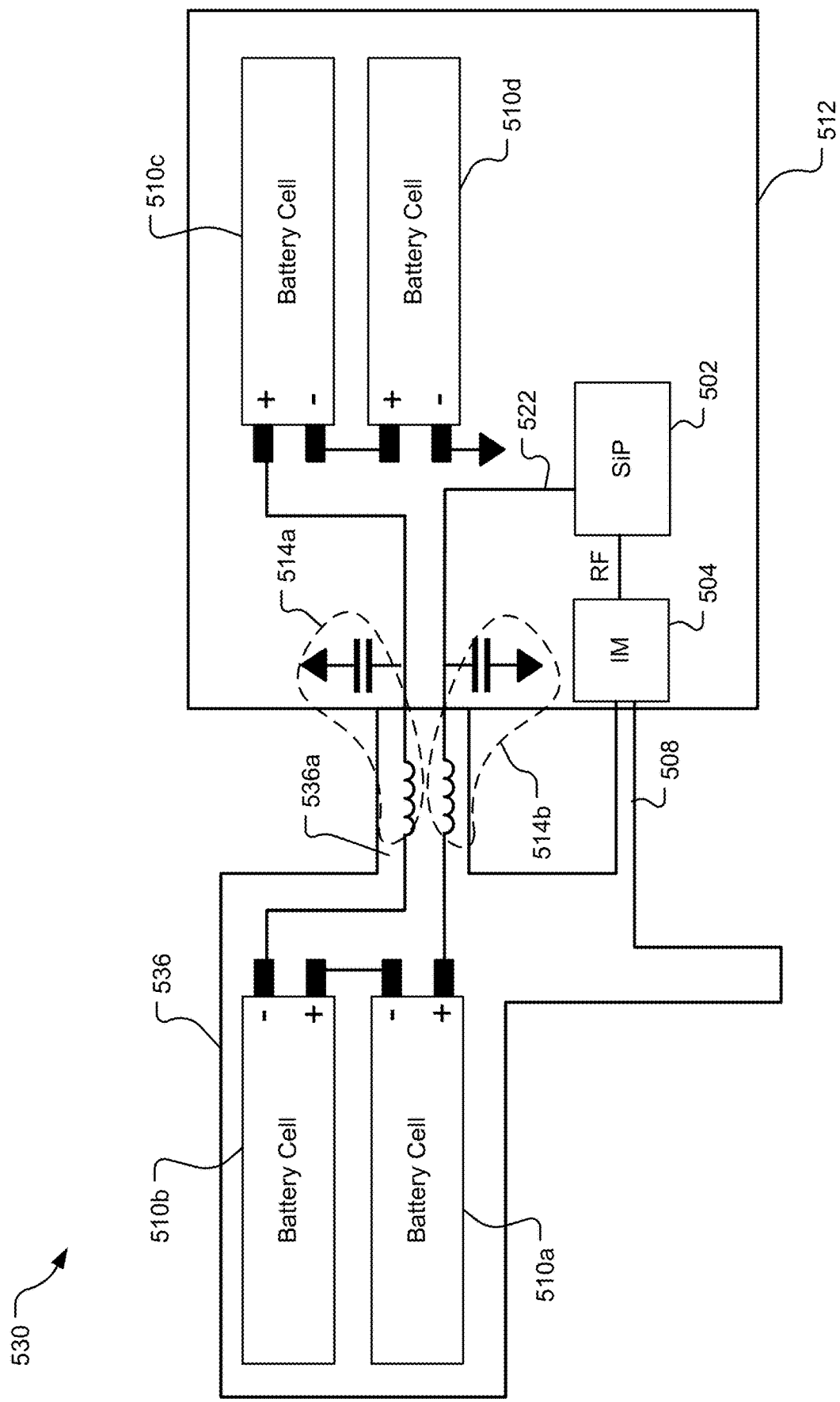

Referring to FIG. 5B, a fourth example smart label 530 including an IFA type antenna 536 is shown. The IFA type antenna 536 includes a grounding leg 536a that is electrically coupled to the ground area 512. The ground area 512 may be a conductor (e.g., copper cladding, mesh, etc.) disposed on a layer of the FPC. The DC lines may be routed through the antenna grounding leg 536a to reduce the impact on the antenna. In an example, the RF decoupling circuits 514a, 514b may be aligned with the antenna grounding leg 536a. The IFA type antenna 536 is coupled to the antenna tuning circuit 504 via the feedline 508.

Figure 5C:
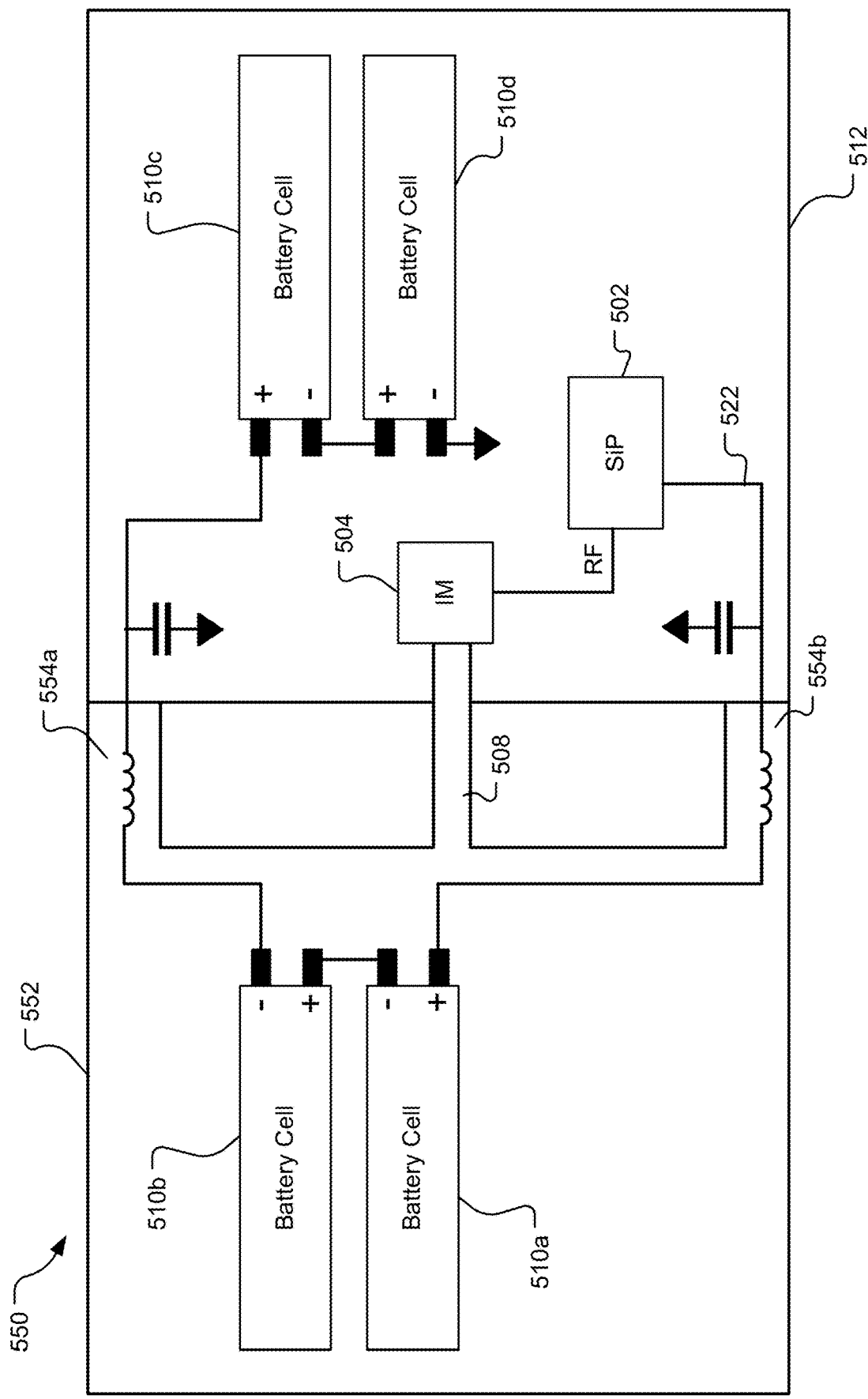

Referring to FIG. 5C, a fifth example smart label 550 includes a slot/loop antenna 552 with a plurality of antenna ground legs electrically coupled to the ground area 512. The DC lines may be routed through the antenna ground legs to reduce the impact on the antenna. In an example, a first antenna grounding leg 554a and a second antenna grounding leg 554b may be electrically coupled to the ground area 512. RF decoupling components (e.g., inductors, capacitor, ferrite beads) may also be disposed on the DC lines as previously described. The feedline 508 is coupled to the antenna tuning circuit 504 and may be a portion of the slot/loop antenna 552 (e.g., a metallic strip). Other feedline configurations may be used to couple the antenna tuning circuit 504 to the slot/loop antenna 552. The locations of the battery cells 510a, 510b, 510c, 510d and the antenna grounding legs 554a, 554b are examples. Other battery dimensions, configurations and DC conductor paths may be used and the locations of the antenna grounding legs 554a, 554b may be modified to reduce the impact on the slot/loop antenna 552.

Figure 5D:
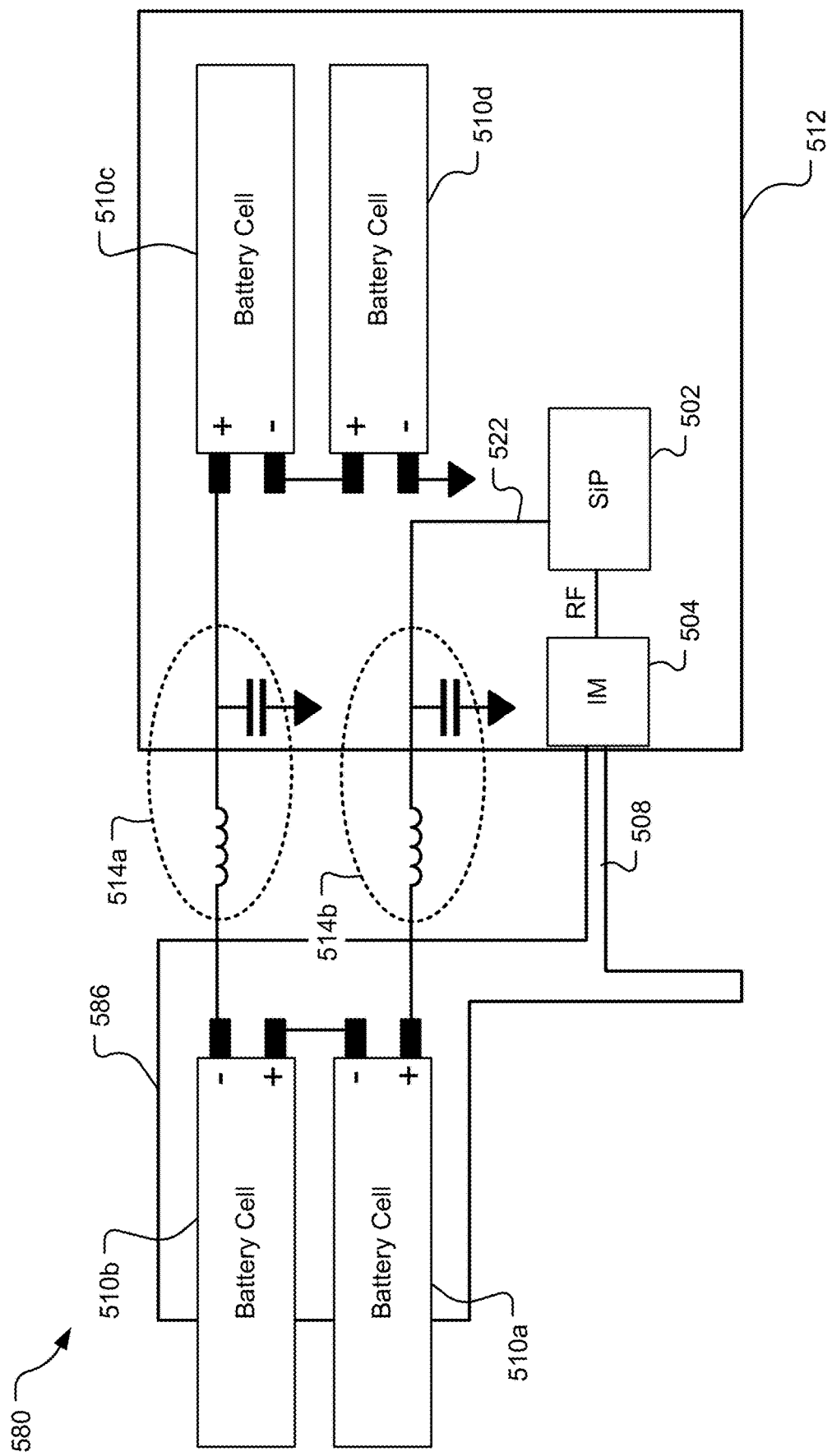

Referring to FIG. 5D, with further reference to FIG. 5A, a sixth example smart label 580 with a monopole antenna 586 is shown. The dimensions of the antennas depicted in the example smart labels 500, 530, 550, 580 may vary relative to the dimensions of the battery cells and the resulting geometric overlap and electromagnetic coupling between the antenna elements and the battery cells may also vary. As used herein, a geometric overlap means that at least a portion of an antenna element is directly over or under a portion of a battery cell when viewed from a perspective that is orthogonal to the plane of the circuit board. For example, the monopole antenna 506 may extend for the length the first battery cell 510a, and the monopole antenna 586 may extend for a portion of the first battery cell 510a. Similar variations may apply to the widths of the first battery cells. Other dimensions and orientations between antenna elements as depicted in FIGS. 5A-5D may also be used to enable electromagnetic coupling between the battery cells and the antennas. For example, antenna elements may be disposed on two separate layers on either side of a battery cell (e.g., sandwich configuration), and the battery cell may have differing levels of geometric overlaps with the respective antenna elements.

Figure 6:
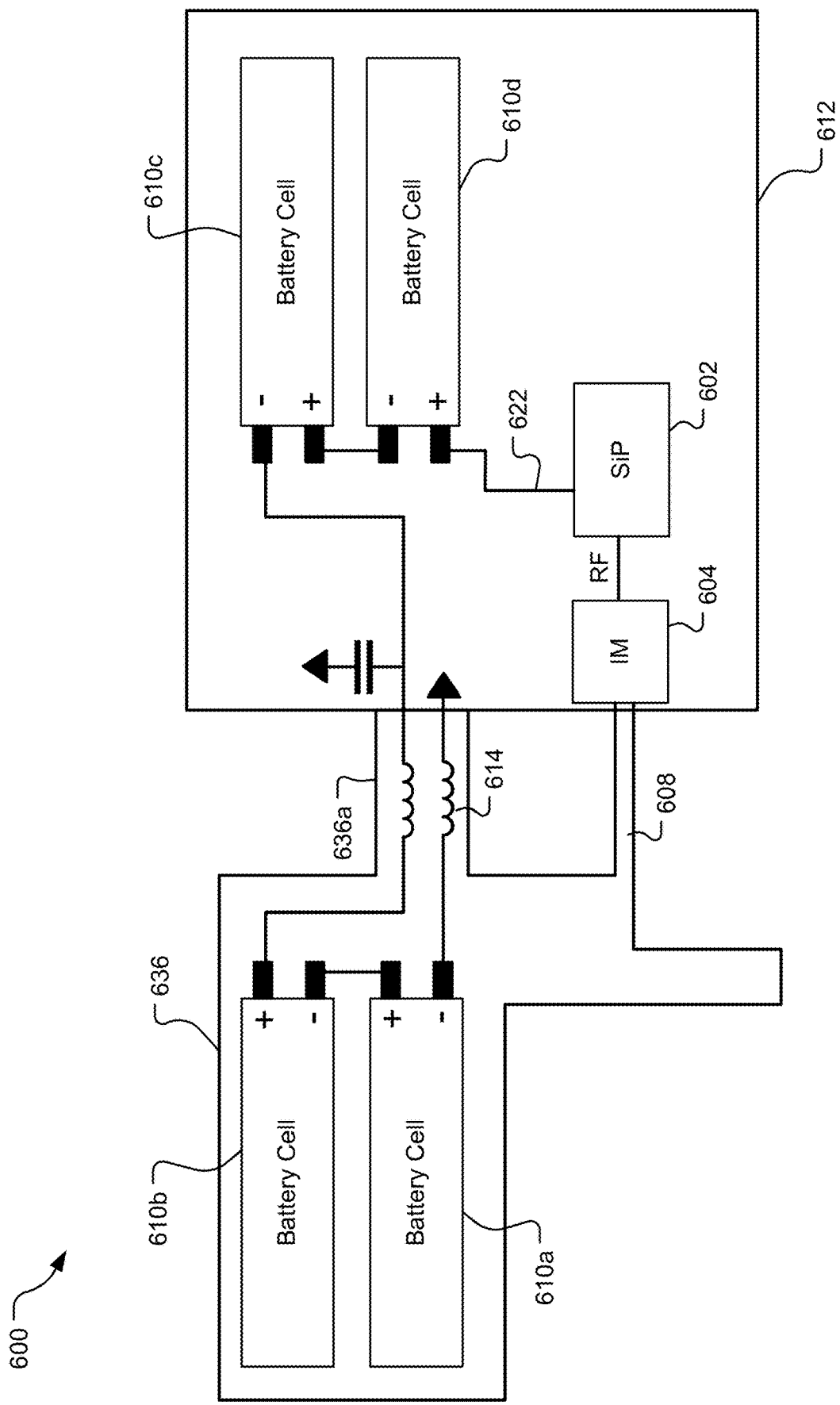
FIG. 6 is a block diagram of an example smart label with an antenna element coupled to a flexible battery cell.

Referring to FIG. 6, with further reference to FIGS. 5A-5D, a seventh example smart label 600 includes a SiP 602, an antenna tuning circuit 604, an IFA type antenna 636, a plurality of battery cells 610a, 610b, 610c, 610d, and a ground area 612. The SiP 602 may include some or all of the components of the communications circuit 300 and is configured to couple to the IFA type antenna 636 via the antenna tuning circuit 604 and a feedline 608. The IFA type antenna 636 includes an antenna grounding leg 636a that is electrically coupled to the ground area 612. The ground area 612 may be a conductor (e.g., copper cladding, mesh, etc.) disposed on a layer of the FPC. The DC lines may be routed through the antenna grounding leg 636a to reduce the impact on the antenna. The battery cells 610a, 610b, 610c, 610d may be configured to provide a DC voltage to the SiP 602 via a DC feed line 622. The seventh example smart label 600 is similar to the fourth example smart label 530 but utilizes a different DC power arrangement. The IFA type antenna 636 is an example and other antenna configurations (e.g., monopole, loop) may be used. For antennas with ground connections, the battery cells may be arranged such that the last negative terminal is on the antenna (e.g., the negative terminal of the first battery cell 610a is disposed in the area of the IFA type antenna 636). In this configuration, the terminal may be connected directly to the antenna (DC ground) or via an inductor 614 or ferrite bead. Other RF isolation components may be used.

Figure 7:
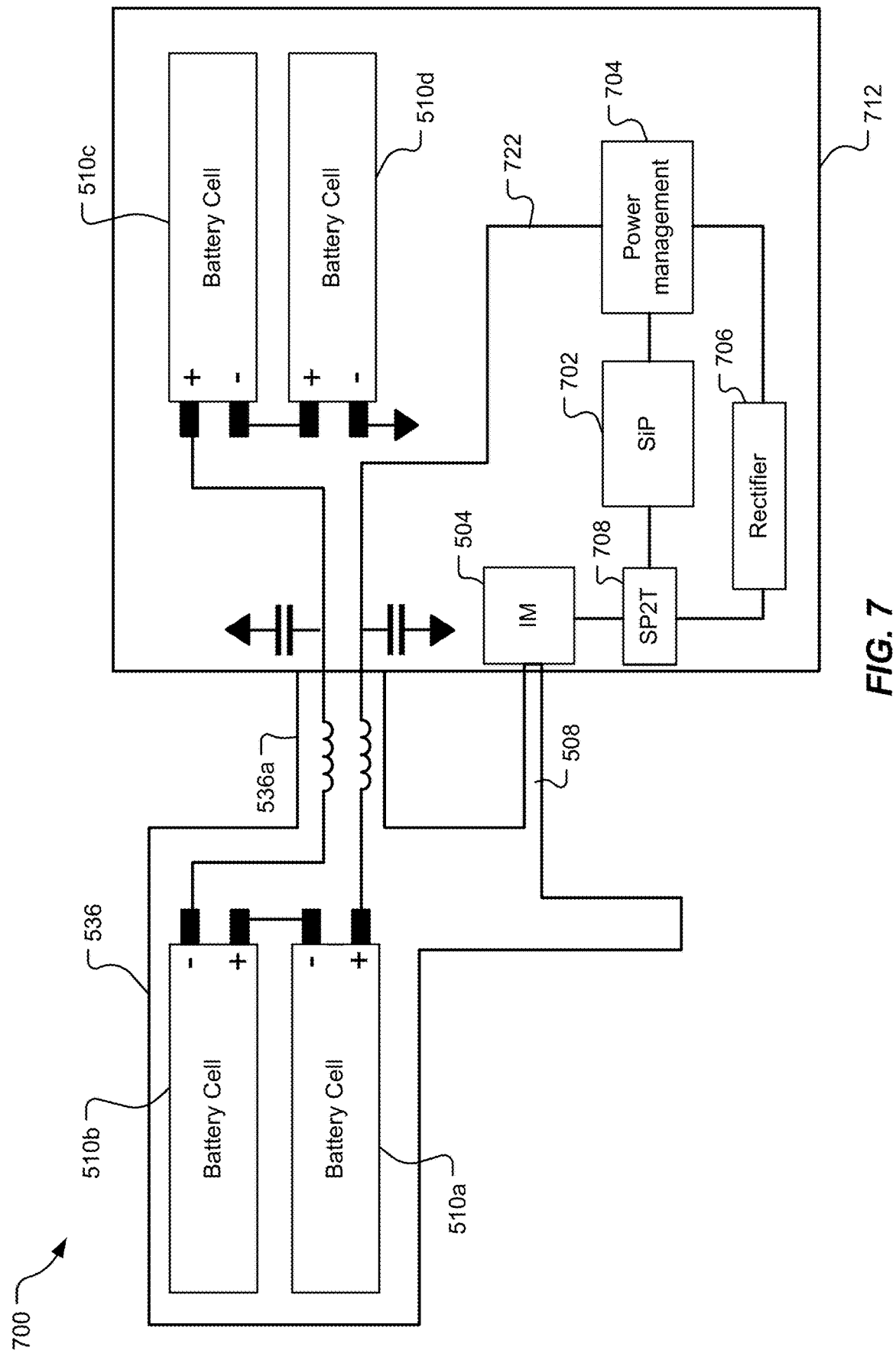
FIG. 7 is a block diagram of an example smart label configured for energy harvesting.

Referring to FIG. 7, with further reference to FIGS. 5A-5D, a block diagram of an eighth example smart label 700 configured for energy harvesting is shown. The battery antenna concepts described in FIGS. 4A-5D may also include components to enable RF energy harvesting. For example, a single pole double throw (SP2T) switch may be used to multiplex between communications and harvesting modes. The harvesting mode may include utilizing ambient RF signals (e.g., external RF signals based on WLAN and WWAN transmissions) to charge the flexible batteries. The eighth example smart label 700 utilizes an IFA type antenna, but monopole and slot antenna configurations may also be used. The eighth example smart label 700 includes a SiP 702, a power management circuit 704, a rectifier 706, a SP2T switch 708, the antenna tuning circuit 504, the IFA type antenna 536, the plurality of battery cells 510a, 510b, 510c, 510d, a plurality of RF decoupling circuits, and a ground area 712. The SiP 702 may include some or all of the components of the communications circuit 300 and may be configured to control the energy harvesting operations.

In operation, the power management circuit 704 (which may be included in the SiP 702) may measure a voltage on a DC line 722 to determine the charge state of the battery cells 510a-d. For example, if the voltage drops below 4.5V, or another threshold value, then the SP2T switch 708 may be configured for power harvesting operations. In a first position, the SP2T may enable communication signals to be processed by the SiP 702, and in a second position the SP2T may enable external RF signals to be processed by the rectifier 706. The rectifier 706 is configured to convert the external RF signals to a DC output to enable the power management circuit 704 to provide a charging voltage to one or more of the battery cells. The rectifier 706 may include diodes and capacitors as known in the art to rectify the RF signal and reduce ripple in the DC output (e.g., voltage doubler circuit). The antenna tuning circuit 504 may be configured to provide impedance matching for the received RF signal. In an example, the SiP 702 may be configured to control the impedance of the antenna tuning circuit 504.

Figure 8:
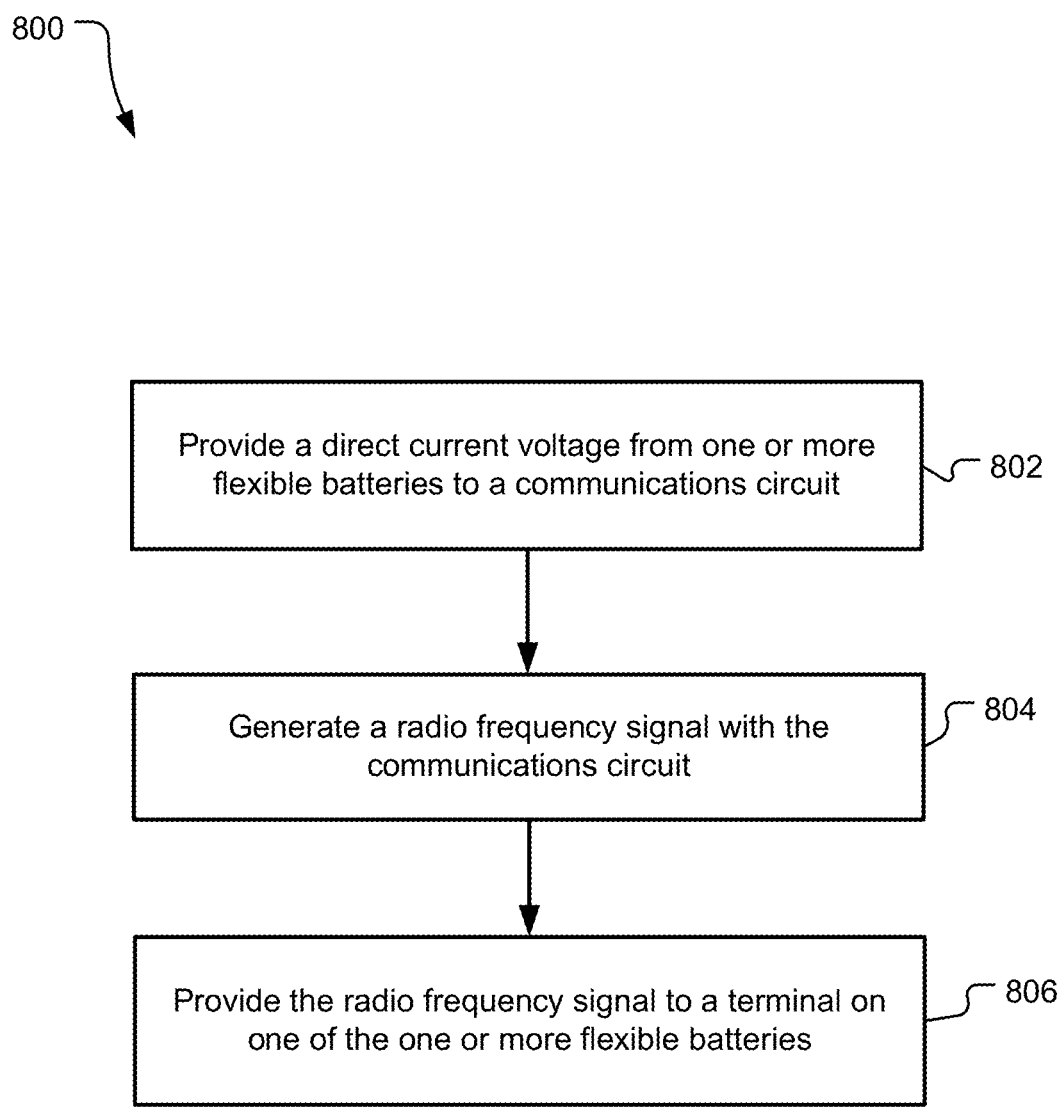
FIG. 8 is a flow diagram illustrating an example method for transmitting a radio frequency signal with a flexible battery.

Referring to FIG. 8, a flow diagram illustrating an example method 800 for transmitting a radio frequency signal with a flexible battery includes the stages shown. The method 800 is, however, an example and not limiting. The method 800 may be altered, e.g., by having stages added, removed, rearranged, combined, performed concurrently, and/or having single stages split into multiple stages. For example, the method 800 may include receiving radio frequency signals via one or more flexible batteries.

At stage 802, the method includes providing a direct current voltage from one or more flexible batteries to a communications circuit. A flexible battery cell, such as the first battery cell 410*a*, is a means for providing the DC voltage to the communications circuit. In an example, referring to FIG. 4A, a positive terminal of the first battery cell 410*a* is electrically coupled to a DC power-in port on the SiP 402. One or more RF decouplers, such as inductors and capacitors (e.g., in a bias tee configuration) may be disposed between the first battery cell 410*a* and the SiP 402.

At stage 804, the method includes generating a radio frequency signal with the communications circuit. The SiP 402 is a means for generating the radio frequency signal. The SiP 402 may be configured to send and receive RF signals based on WWAN and WLAN protocols. In an example, the SiP 402 may include some or all of the components of the communications circuit 300. For example, the SiP 402 may be configured for cellular technologies such as 5G NR and LTE (e.g., Rel. 14 LTE Cat-NB2) and may utilize one or more frequency bands. Other WWAN technologies may also be used. The SiP 402 may utilize sidelink technologies such as WiFi, Bluetooth®, UWB, 5G Sidelink, etc. In an example, the radio frequency may be in a range from 700 MHz to 2.2 GHz for NBIOT based asset tracking. Other frequencies may also be used.

At stage 806, the method includes providing the radio frequency signal to a terminal on one of the one or more flexible batteries. A feedline 408 is a means for providing the RF signal. In an example, referring to FIG. 4A, the SiP 402 may provide the RF signal to the antenna tuning circuit 404 configured to match impedance to reduce reflected signals from the first battery cell 410*a*. A DC blocking circuit 406 (e.g., capacitor) may be disposed on the feedline 408 to block the DC voltage. The first battery cell 410*a* will act as a main radiator (e.g., antenna) for the RF signal. In an example, the dimension of the first battery cell 410*a* may be selected based on the frequency of the RF signal provided by the SiP 402. That is, the dimensions of the battery cells in the example smart labels may be designed to improve antenna performance for desired frequency bands while simultaneously provided enough battery capacity to provide adequate power to the SIP and/or other components in the smart label.

Figure 9:
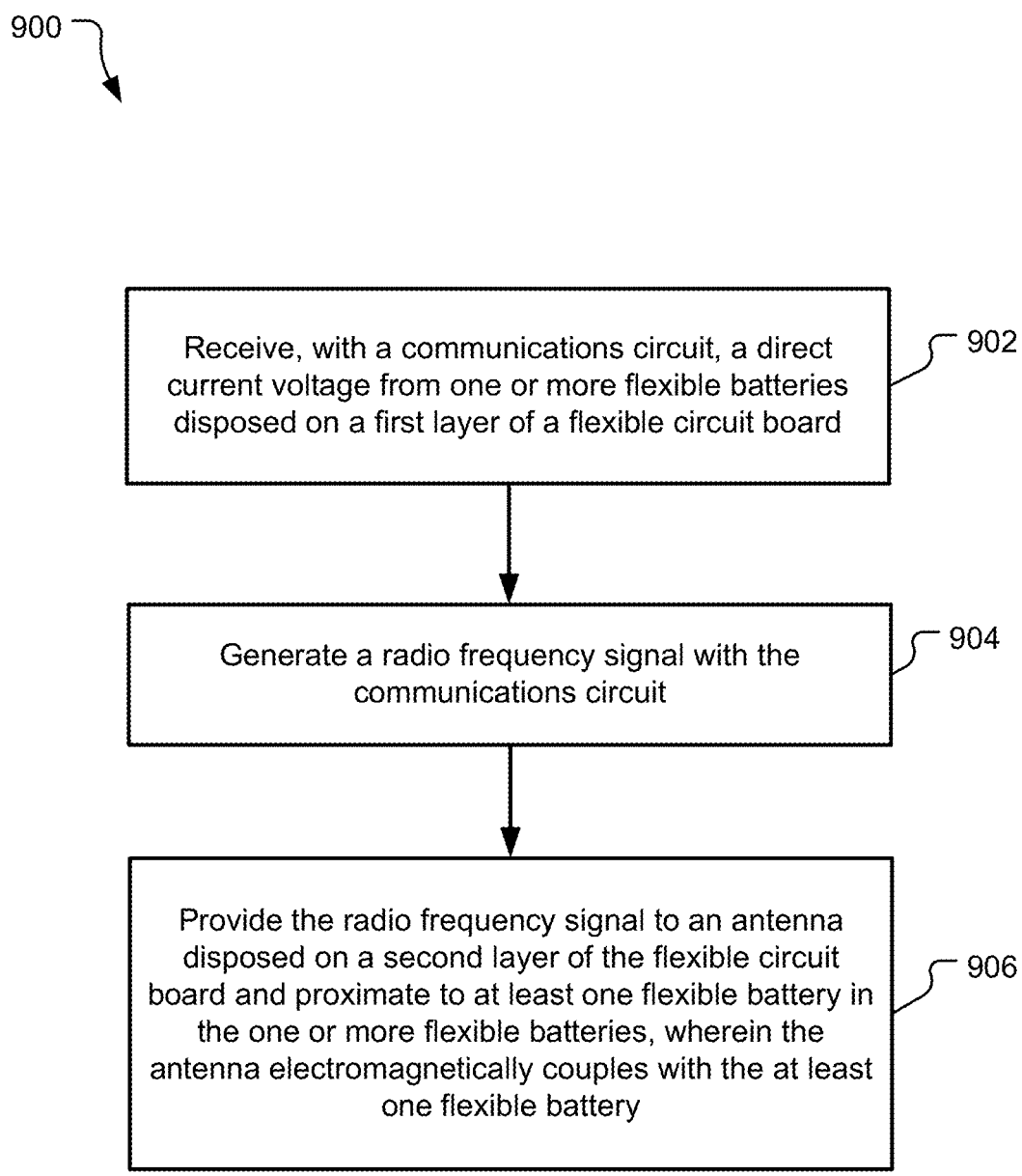
FIG. 9 is a flow diagram illustrating an example method for transmitting a radio frequency signal with a smart label.

Referring to FIG. 9, a flow diagram illustrating an example method 900 transmitting a radio frequency signal with a smart label includes the stages shown. The method 900 is, however, an example and not limiting. The method 900 may be altered, e.g., by having stages added, removed, rearranged, combined, performed concurrently, and/or having single stages split into multiple stages. For example, the method 900 may include receiving radio frequency signals with the smart label.

At stage 902, the method includes receiving, with a communications circuit, a direct current voltage from one or more flexible batteries disposed on a first layer of a flexible circuit board. The SiP 502, including the communications circuit 300, is a means for receiving the DC voltage from the flexible batteries. In an example, referring to FIG. 5B, the DC power feed 522 is configured to provide the DC voltage to the SiP 502. One or more RF decoupling circuits 514*a*, 514*b* may be implemented on the power feed lines to filter out RF signals in the power feed.

At stage 904, the method includes generating a radio frequency signal with the communications circuit. The SiP 402 is a means for generating the radio frequency signal. The SiP 402 may be configured to send and receive RF signals based on WWAN and WLAN protocols. In an example, the SiP 402 may include some or all of the components of the communications circuit 300. For example, the SiP 402 may be configured for cellular technologies such as 5G NR and LTE (e.g., Rel. 14 LTE Cat-NB2) and may utilize one or more frequency bands. Other WWAN technologies may also be used. The SiP 402 may utilize sidelink technologies such as WiFi, Bluetooth®, UWB, 5G Sidelink, etc. In an example, the radio frequency may be in a range from 700 MHz to 2.2 GHz for NBIOT based asset tracking. Other frequencies may also be used.

At stage 906, the method includes providing the radio frequency signal to an antenna disposed on a second layer of the flexible circuit board and proximate to at least one flexible battery in the one or more flexible batteries, wherein the antenna electromagnetically couples with the at least one flexible battery. A feedline 508 is a means for providing the RF signal to the antenna. In an example, referring to FIG. 5B, the SiP 502 may provide the RF signal to the antenna tuning circuit 504 configured to match impedance to reduce reflected signals from the IFA type antenna 536 when electromagnetically coupled with the first and second battery cells 510*a*, 510*b*. The electromagnetic coupling with the battery cells may vary the impedance of the IFA type antenna 536, and the antenna tuning circuit 504 may be configured to match the resulting impedance. Other antenna configurations, such as monopole antenna 506 and slot/loop antenna 552 as described herein, as well as other patch and strip configurations may also be used. In operation, one or more of the battery cells may act as parasitic resonators based on the frequency of the RF signal. In an example, the dimensions of the battery cells may be selected based at least in part on the desired frequency of the RF signal. The first and second layers of the flexible circuit board may be a flexible dielectric configured to prevent direct/physical connection between the battery cells and the antenna. In an example, the dielectric may have a dielectric constant in the range of 2.5 to 5. Other materials may also be used.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A smart label, comprising: a flexible circuit board; a communications circuit including at least one transceiver disposed on the flexible circuit board; an antenna tuning circuit disposed on the flexible circuit board and configured to receive radio frequency signals from the communications circuit; and at least one flexible battery disposed on the flexible circuit board and configured to provide power to the communications circuit and receive the radio frequency signals from the antenna tuning circuit.

Clause 2. The smart label of clause 1, further comprising one or more radio frequency decoupling circuits disposed between the at least one flexible battery and the communications circuit.

Clause 3. The smart label of either clauses 1 or 2, wherein the at least one flexible battery is configured to receive the radio frequency signals via a positive terminal.

Clause 4. The smart label of any of clauses 1 through 3, wherein the antenna tuning circuit includes one or more variable capacitors configured to vary an impedance of the antenna tuning circuit.

Clause 5. The smart label of any of clause 4, wherein the communications circuit is configured to provide a control signal to the antenna tuning circuit to set a capacitance value of the one or more variable capacitors.

Clause 6. The smart label of any of clauses 1 through 5, wherein the radio frequency signals are utilized in a wireless wide area network (WWAN), and/or wherein the communications circuit is configured to communicate via a wireless wide area network (WWAN).

Clause 7. The smart label of any of clauses 1 through 5, wherein the radio frequency signals are utilized in a wireless local area network (WLAN), and/or wherein the communications circuit is configured to communicate via a wireless local area network (WLAN).

Clause 8. The smart label of any of clauses 1 through 7, wherein the radio frequency signals are within a range from 700 MHz to 2.2 GHz.

Clause 9. The smart label of any of clauses 1 through 8, wherein the communications circuit is configured to receive external radio frequency signals via the at least one flexible battery.

Clause 10. A smart label, comprising: a flexible circuit board comprising two or more layers; a communications circuit including at least one transceiver disposed on one of the two or more layers; an antenna tuning circuit disposed on one of the two or more layers and configured to receive radio frequency signals from the communications circuit; at least one flexible battery disposed on a first layer of the two or more layers and configured to provide power to the communications circuit; and an antenna element disposed on a second layer of the two or more layers and proximate to the at least one flexible battery, wherein the antenna element is configured to receive the radio frequency signals from the antenna tuning circuit.

Clause 11. The smart label of clause 10, wherein the antenna element is electromagnetically coupled to the at least one flexible battery.

Clause 12. The smart label of either clauses 10 or 11, wherein the antenna element is configured as a monopole antenna, an inverted F type antenna, a slot antenna, or a loop antenna.

Clause 13. The smart label of any of clauses 10 through 12, further comprising one or more radio frequency decoupling circuits disposed between the at least one flexible battery and the communications circuit.

Clause 14. The smart label of any of clauses 10 through 13, wherein the antenna tuning circuit includes one or more variable capacitors configured to vary an impedance of the antenna tuning circuit.

Clause 15. The smart label of clause 14, wherein the communications circuit is configured to provide a control signal to the antenna tuning circuit to set a capacitance value of the one or more variable capacitors.

Clause 16. The smart label of any of clauses 10 through 15, wherein the radio frequency signals are utilized in a wireless wide area network (WWAN), and/or wherein the communications circuit is configured to communicate via a wireless wide area network (WWAN).

Clause 17. The smart label of any of clauses 10 through 15, wherein the radio frequency signals are utilized in a wireless local area network (WLAN), and/or wherein the communications circuit is configured to communicate via a wireless local area network (WLAN).

Clause 18. The smart label of any of clauses 10 through 17, wherein the radio frequency signals are within a range from 700 MHz to 2.2 GHz.

Clause 19. The smart label of any of clauses 10 through 18, wherein the communications circuit is configured to receive external radio frequency signals via the antenna element.

Clause 20. The smart label of clause 10, further comprising: a rectifier circuit disposed on one of the two or more layers; and a power management circuit disposed on one of the two or more layers and configured to receive a direct current signal from the rectifier circuit, wherein the direct current signal is obtained from external radio frequency signals received by the antenna element.

Clause 21. The smart label of any of clauses 10 through 20, wherein there is a geometric overlap between the at least one flexible battery disposed on the first layer and the antenna element disposed on the second layer.

Clause 22. A method of transmitting a radio frequency signal with a flexible battery, comprising: providing a direct current voltage from one or more flexible batteries to a communications circuit; generating the radio frequency signal with the communications circuit; and providing the radio frequency signal to a terminal on one of the one or more flexible batteries.

Clause 23. The method of clause 22, wherein providing the direct current voltage to the communications circuit includes filtering the direct current voltage with one or more radio frequency decouplers disposed between the one or more flexible batteries and the communications circuit.

Clause 24. The method of either clause 22 or 23, wherein the terminal on one of the one or more flexible batteries is a positive terminal.

Clause 25. The method of any of clauses 22 through 24, wherein providing the radio frequency signal to the terminal includes tuning a radio frequency signal feedline with an antenna tuning circuit.

Clause 26. A method for transmitting a radio frequency signal with a smart label, comprising: receiving, with a communications circuit, a direct current voltage from one or more flexible batteries disposed on a first layer of a flexible circuit board; generating the radio frequency signal with the communications circuit; and providing the radio frequency signal to an antenna disposed on a second layer of the flexible circuit board and proximate to at least one flexible battery in the one or more flexible batteries, wherein the antenna electromagnetically couples with the at least one flexible battery.

Clause 27. The method of clause 26, wherein providing the radio frequency signal to the antenna includes tuning a radio frequency feedline with an antenna tuning circuit.

Clause 28. The method of either clause 26 or 27, wherein receiving the direct current voltage from the one or more flexible batteries includes filtering the direct current voltage with one or more radio frequency decouplers disposed between the one or more flexible batteries and the communications circuit.

Clause 29. An apparatus for transmitting a radio frequency signal, comprising: means for generating the radio frequency signal; means for providing a direct current voltage to the means for generating the radio frequency signal, the means for providing the direct current voltage being disposed on a first layer of a flexible circuit board; and means for radiating the radio frequency signal disposed on a second layer of the flexible circuit board and proximate to the means for providing the direct current voltage, wherein the means for radiating the radio frequency signal is configured to electromagnetically couple with the means for providing the direct current voltage.

Clause 30. The apparatus of clause 29, further comprising a tuning means disposed between the means for radiating the radio frequency signal and the means for generating the radio frequency signal.

Clause 31. The apparatus of either of clauses 29 or 30, further comprising a filtering means disposed between the means for providing the direct current voltage and the means for generating the radio frequency signal.

Clause 32. The apparatus of any of clauses 29 through 31, wherein there is a geometric overlap between the means for providing the direct current voltage disposed on the first layer of the flexible circuit board, and the means for radiating the radio frequency signal disposed on the second layer of the flexible circuit board.

Clause 33. An apparatus for transmitting a radio frequency signal, comprising: a flexible substrate; means for generating the radio frequency signal disposed on the flexible substrate; and flexible battery means for providing a direct current voltage to the means for generating the radio frequency signal and for radiating the radio frequency signal, the flexible battery means being disposed on the flexible substrate and electrically coupled to the means for generating the radio frequency signal.

Clause 34. The apparatus of clause 33, further comprising a tuning means disposed between the means for generating the radio frequency signal and the flexible battery means.

Clause 35. The apparatus of either of clause 33 or 34, further comprising a filtering means disposed between the flexible battery means and the means for generating the radio frequency signal.

The invention claimed is:

1. A smart label, comprising:
a flexible circuit board;
a communications circuit including at least one transceiver disposed on the flexible circuit board;
an antenna tuning circuit disposed on the flexible circuit board and configured to receive radio frequency signals from the communications circuit; and
at least one flexible battery disposed on the flexible circuit board and configured to provide power to the communications circuit and receive the radio frequency signals from the antenna tuning circuit.

2. The smart label of claim 1, further comprising one or more radio frequency decoupling circuits disposed between the at least one flexible battery and the communications circuit.

3. The smart label of claim 1, wherein the at least one flexible battery is configured to receive the radio frequency signals via a positive terminal.

4. The smart label of claim 1, wherein the antenna tuning circuit includes one or more variable capacitors configured to vary an impedance of the antenna tuning circuit.

5. The smart label of claim 4, wherein the communications circuit is configured to provide a control signal to the antenna tuning circuit to set a capacitance value of the one or more variable capacitors.

6. The smart label of claim 1, wherein the communications circuit is configured to communicate via a wireless wide area network (WWAN).

7. The smart label of claim 1, wherein the communications circuit is configured to communicate via a wireless local area network (WLAN).

8. The smart label of claim 1, wherein the radio frequency signals are within a range from 700 MHz to 2.2 GHz.

9. The smart label of claim 1, wherein the communications circuit is configured to receive external radio frequency signals via the at least one flexible battery.

10. A smart label, comprising:
a flexible circuit board comprising two or more layers;
a communications circuit including at least one transceiver disposed on one of the two or more layers;
an antenna tuning circuit disposed on one of the two or more layers and configured to receive radio frequency signals from the communications circuit;
at least one flexible battery disposed on a first layer of the two or more layers and configured to provide power to the communications circuit; and
an antenna element disposed on a second layer of the two or more layers and proximate to the at least one flexible battery, wherein the antenna element is configured to receive the radio frequency signals from the antenna tuning circuit.

11. The smart label of claim 10, wherein the antenna element is electromagnetically coupled to the at least one flexible battery.

12. The smart label of claim 10, wherein the antenna element is configured as a monopole antenna, an inverted F type antenna, a slot antenna, or a loop antenna.

13. The smart label of claim 10, further comprising one or more radio frequency decoupling circuits disposed between the at least one flexible battery and the communications circuit.

14. The smart label of claim 10, wherein the antenna tuning circuit includes one or more variable capacitors configured to vary an impedance of the antenna tuning circuit.

15. The smart label of claim 14, wherein the communications circuit is configured to provide a control signal to the antenna tuning circuit to set a capacitance value of the one or more variable capacitors.

16. The smart label of claim 10, wherein the communications circuit is configured to communicate via a wireless wide area network (WWAN) or via a wireless local area network (WLAN).

17. The smart label of claim 10, wherein the radio frequency signals are within a range from 700 MHz to 2.2 GHz.

18. The smart label of claim 10, wherein the communications circuit is configured to receive external radio frequency signals via the antenna element.

19. The smart label of claim 10, further comprising:

a rectifier circuit disposed on one of the two or more layers; and a power management circuit disposed on one of the two or more layers and configured to receive a direct current signal from the rectifier circuit, wherein the direct current signal is obtained from external radio frequency signals received by the antenna element.

20. The smart label of claim 10, wherein there is a geometric overlap between the at least one flexible battery disposed on the first layer and the antenna element disposed on the second layer.

\* \* \* \* \*